(12) United States Patent
Santry (10) Patent No.: US 11,372,918 B2
(45) Date of Patent: Jun. 28, 2022

(54) METHODS FOR PERFORMING INPUT-OUTPUT OPERATIONS IN A STORAGE SYSTEM USING ARTIFICIAL INTELLIGENCE AND DEVICES THEREOF

(71) Applicant: NetApp, Inc., Sunnyvale, CA (US)

(72) Inventor: Douglas Joseph Santry, Kent (GB)

(73) Assignee: NETAPP, INC., Sunnyvale, CA (US)

( * ) Notice: Subject to any disclaimer, the term of this patent is extended or adjusted under 35 U.S.C. 154(b) by 174 days.

(21) Appl. No.: 16/752,077

(22) Filed: Jan. 24, 2020

(65) Prior Publication Data
US 2021/0232626 A1    Jul. 29, 2021

(51) Int. Cl.
  *G06F 16/901* (2019.01)
  *G06N 3/04* (2006.01)
  *G06K 9/62* (2022.01)
  *G06F 16/906* (2019.01)

(52) U.S. Cl.
  CPC .......... *G06F 16/901* (2019.01); *G06F 16/906* (2019.01); *G06K 9/6257* (2013.01); *G06N 3/04* (2013.01)

(58) Field of Classification Search
  CPC ... G06F 16/901; G06F 16/906; G06K 9/6257; G06N 3/04
  See application file for complete search history.

(56) References Cited

U.S. PATENT DOCUMENTS

| | | | | |
|---|---|---|---|---|
| 2014/0119291 | A1* | 5/2014 | Lee | H04W 72/0406 370/329 |
| 2020/0057561 | A1* | 2/2020 | Lai | G06F 3/0604 |
| 2020/0192797 | A1* | 6/2020 | Delerse | G06F 12/0875 |
| 2020/0342312 | A1* | 10/2020 | Inagaki | G06N 3/04 |

* cited by examiner

*Primary Examiner* — Irete F Ehichioya
*Assistant Examiner* — Xiaoqin Hu
(74) *Attorney, Agent, or Firm* — Troutman Pepper Hamilton Sanders LLP (Rochester)

(57) ABSTRACT

The present technology relates to identifying one of a plurality of artificial intelligence models based on a received key value. The received key value is applied to the identified one of the artificial intelligence models which is trained to output one of a plurality of actual index values. The one of the actual index values is compared to a range within the actual index values to determine when the one of the actual index value points to the data block. A received input-output operation is performed on the data block when the one of the actual index values is determined to point to the data block.

17 Claims, 11 Drawing Sheets

METHODS FOR PERFORMING INPUT-OUTPUT OPERATIONS IN A STORAGE SYSTEM USING ARTIFICIAL INTELLIGENCE AND DEVICES THEREOF

FIELD

The present technology pertains to the field of storage management, and particularly, directed to a method for performing input-output operations in a storage system using machine learning techniques and devices.

BACKGROUND

Secondary storage is currently used to store large amounts of data for a number of reasons, such as to accommodate data that cannot fit in the main memory. Accordingly, when the data is written or stored in the secondary storage, prior technologies have indexed the data stored in the secondary storage so that data can be repeatedly accessed. Further, prior technologies have used data structures, such as a traditional search tree, to index data on secondary storage. For example, prior technologies have indexed the blocks that contain the file data. As a result to retrieve the data that is stored in this manner, a file system must map a file block number to a physical disk address.

Unfortunately, one of the technological problems associated with this prior technology is that multiple media access or memory access is required to access a block that has been indexed as discussed above. In other words, searching for data in traditional search trees involves explicitly enumerating the physical address of the block of data within a traditional search tree and then traversing the traditional search tree. Traversing the traditional search tree requires a number of input-output operations due to the structure of the search tree, thereby restricting the use of processing cycles for other important input-output operations.

DETAILED DESCRIPTION

Figure 1:
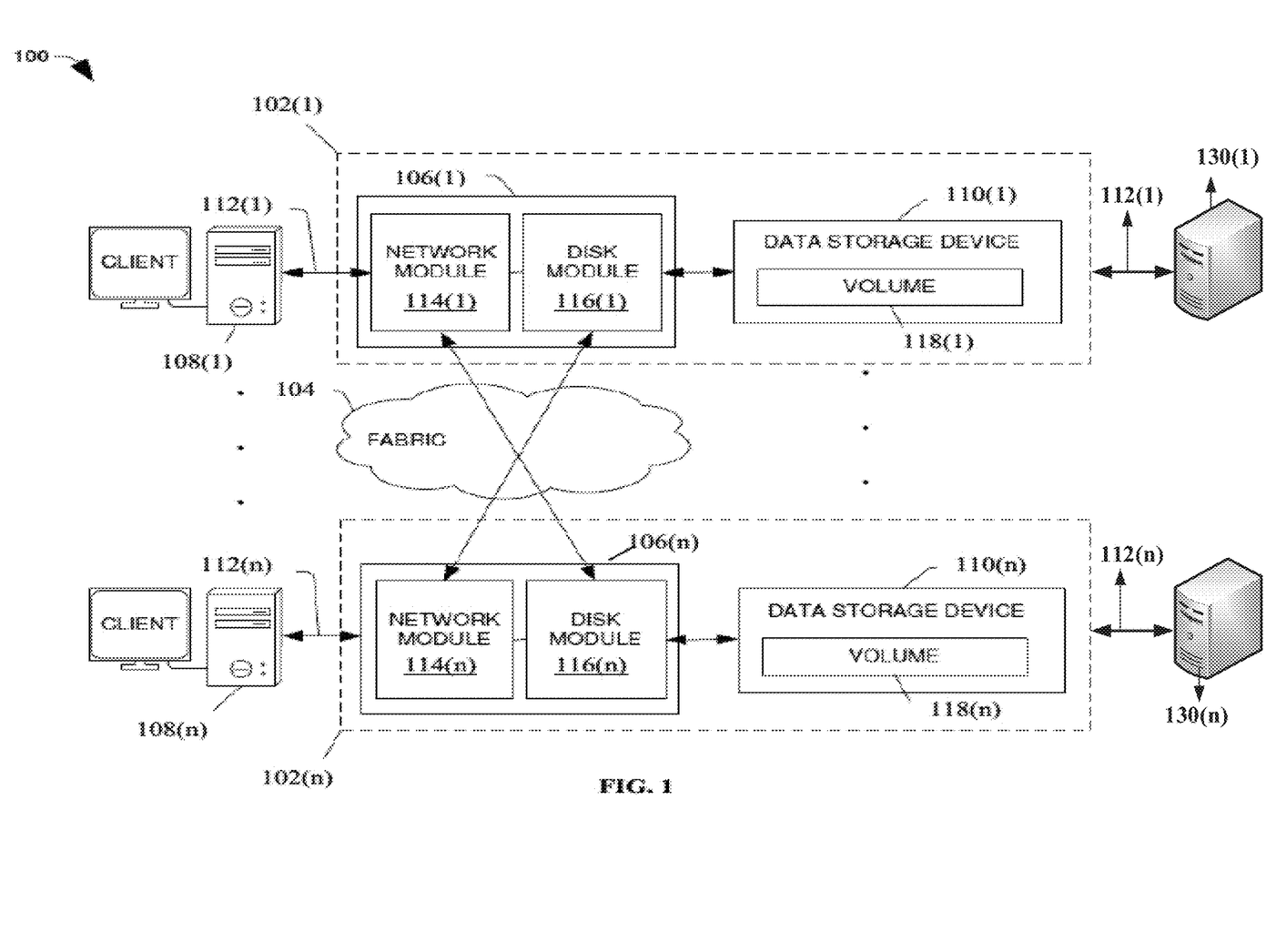
FIG. 1 is a block diagram of a network environment with exemplary data storage apparatuses each including a node computing device.

A clustered network environment 100 that may implement one or more aspects of the technology described and illustrated herein is shown in FIG. 1. The clustered network environment 100 includes data storage apparatuses 102(1)-102(n) that are coupled over a cluster fabric 104 facilitating communication between the data storage apparatuses 102(1)-102(n) (and one or more modules, components, etc. therein, such as, node computing devices 106(1)-106(n), for example), although any number of other elements or components can also be included in the clustered network environment 100 in other examples.

This technology provides a number of advantages including methods, non-transitory computer readable media, and devices that enable more effectively and efficiently performing input-output operations in a storage system through the application of specifically trained artificial intelligence models. Additionally, the disclosed technology provides a more effective technological solution to the technological problems discussed in the background by avoiding the need to store the physical address of the data present within a volume, thereby significantly reducing the number of media access requests required to perform input-output operations. In other words, the disclosed technology provides specially trained artificial intelligence models that can quickly learn the location of the data within the volume and thus avoid the need to index the block of data using the physical address. Additionally, for these specially trained artificial intelligence models, the disclosed technology advantageously uses small neural networks (i.e., the number of neural networks that can be trained within one millisecond) which can be quickly trained to learn any changes to the data within the file.

In this example, node computing devices 106(1)-106(n) can be primary or local storage controllers or secondary or remote storage controllers that provide client devices 108(1)-108(n), with access to data stored within data storage devices 110(1)-110(n). Additionally in this example, the node computing devices 106(1)-106(n) can obtain or receive training data to train the neural network(s) from training data servers 130(1)-130(n), although the training data can be obtained or received from other locations. The data storage apparatuses 102(1)-102(n) and/or node computing device 106(1)-106(n) of the examples described and illustrated herein are not limited to any particular geographic areas and can be clustered locally and/or remotely. Thus, in one example the data storage apparatuses 102(1)-102(n) and/or node computing device 106(1)-106(n) can be distributed over a plurality of storage systems located in a plurality of geographic locations. In another example, a clustered network can include data storage apparatuses 102(1)-102(n) and/or node computing device 106(1)-106(n) residing in a same geographic location (e.g., in a single onsite rack).

In the illustrated example, one or more of the client devices 108(1)-108(n), which may be, for example, personal computers (PCs), computing devices or storage (e.g., storage servers), and other computers or peripheral devices, are coupled to the respective data storage apparatuses 102(1)-102(n) by storage network connections 112(1)-112(n). Network connections 112(1)-112(n) may include a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc.

Illustratively, the client devices 108(1)-108(n) may be general-purpose computers running applications, and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage control configured to process I/O commands issued by the client devices 108(1)-108(n)), and the data storage apparatuses 102(1)-102(n) may return results of the request to the client devices 108(1)-108(n) via the storage network connections 112(1)-112(n).

The training data servers 130(1)-130(n) may be general-purpose computers running applications, and may interact with the data storage apparatuses 102(1)-102(n) using a client/server model for exchange of information. That is, the training data servers 130(1)-130(n) may provide data to the data storage apparatuses 102(1)-102(n) (e.g., data on one of the data storage devices 110(1)-110(n) managed by a network storage control configured to process I/O commands issued by the node computing devices 106(1)-106(n)), and the training data servers 130(1)-130(n) may return results of the request to the data storage apparatuses 102(1)-102(n) via the storage network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint may be stored within a data cloud), etc., for example. Such a node computing device 106(1)-106(n) can be a device attached to the fabric 104 as a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing device 106(1) may be located on a first storage site and the node computing device 106(n) may be located at a second storage site. The node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1) provides client device 108(n) with switchover data access to storage devices 110(n) in the event a disaster occurs at the second storage site). In other examples, the node computing device 106(n) can be configured according to an archival configuration and/or the node computing devices 106(1)-106(n) can be configured based on another type of replication arrangement (e.g., to facilitate load sharing). Additionally, while two node computing devices 106 are illustrated in FIG. 1, any number of node computing devices or data storage apparatuses can be included in other examples in other types of configurations or arrangements.

As illustrated in the clustered network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) and the training data servers 130(1)-130(n) over the storage network connections 112(1)-112(n), for example, allowing the client devices 108(1)-108(n) to access data stored and to obtain training data from the training data servers 130(1)-130(n) in the clustered network environment 100.

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n) when the node computing device 106(n) is available. Alternatively, when the node computing device 106(n) fails, the network module 114(1) of node computing device 106(1) can access the data storage device 110(n) directly via the cluster fabric 104. The cluster fabric 104 can include one or more local and/or wide area computing networks embodied as Infiniband, Fibre Channel (FC), or Ethernet networks, for example, although other types of networks supporting other protocols can also be used.

Disk modules 116(1)-116(n) can be configured to connect data storage devices 110(1)-110(n), such as disks or arrays of disks, SSDs, flash memory, or some other form of data storage, to the node computing devices 106(1)-106(n). Often, disk modules 116(1)-116(n) communicate with the data storage devices 110(1)-110(n) according to the SAN protocol, such as SCSI, FCP, SAS, NVMe, NVMe-oF for example, although other protocols can also be used. Thus, as seen from an operating system on node computing devices 106(1)-106(n), the data storage devices 110(1)-110(n) can appear as locally attached. In this manner, different node computing devices 106(1)-106(n), etc. may access data blocks through the operating system, rather than expressly requesting abstract files.

While the clustered network environment 100 illustrates an equal number of network modules 114(1)-114(n) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) and server devices 130(1)-130(n) can be networked with the node computing devices 106(1)-106(n) in the cluster, over the storage connections 112(1)-112(n). As an example, respective client devices 108(1)-108(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, SSDs, storage class memories and any other similar media adapted to store information, including, for example, data (D) and/or parity (P) information.

The aggregates include volumes 118(1)-118(n) in this example, although any number of volumes can be included in the aggregates. The volumes 118(1)-118(n) are virtual data stores that define an arrangement of storage and one or more file systems within the clustered network environment 100. Volumes 118(1)-118(n) can span a portion of a disk or other storage device, a collection of disks, or portions of disks, for example, and typically define an overall logical arrangement of file storage. In one example volumes 118(1)-118(n) can include stored data as one or more files or objects that reside in a hierarchical directory structure within the volumes 118(1)-118(n). Volumes 118(1)-118(n) are typically configured in formats that may be associated with particular storage systems, and respective volume formats typically comprise features that provide functionality to the volumes 118(1)-118(n), such as providing an ability for volumes 118(1)-118(n) to form clusters.

In one example, to facilitate access to data stored on the disks or other structures of the data storage device 110(1)-110(n), a file system (e.g., write anywhere file system) may be implemented that logically organizes the information as a hierarchical structure of directories and files. In this example, respective files may be implemented as a set of disk blocks configured to store information, whereas directories may be implemented as specially formatted files in which information about other files and directories are stored.

Data can be stored as files or objects within a physical volume and/or a virtual volume, which can be associated with respective volume identifiers, such as file system identifiers (FSIDs). The physical volumes correspond to at least a portion of physical storage devices, such as the data storage device 110(1)-110(n) (e.g., a Redundant Array of Independent (or Inexpensive) Disks (RAID system)) whose address, addressable space, location, etc. does not change. Typically the location of the physical volumes does not change in that the (range of) address(es) used to access it generally remains constant.

Virtual volumes, in contrast, are stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows them to be resized and/or flexible in some regards.

Further, virtual volumes can include one or more logical unit numbers (LUNs), directories, Qtrees, and/or files. Among other things, these features, but more particularly the LUNS, allow the disparate memory locations within which data is stored to be identified, for example, and grouped as a data storage unit. As such, the LUNs may be characterized as constituting a virtual disk or drive upon which data within the virtual volumes is stored within an aggregate. For example, LUNs are often referred to as virtual disks, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

In one example, respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
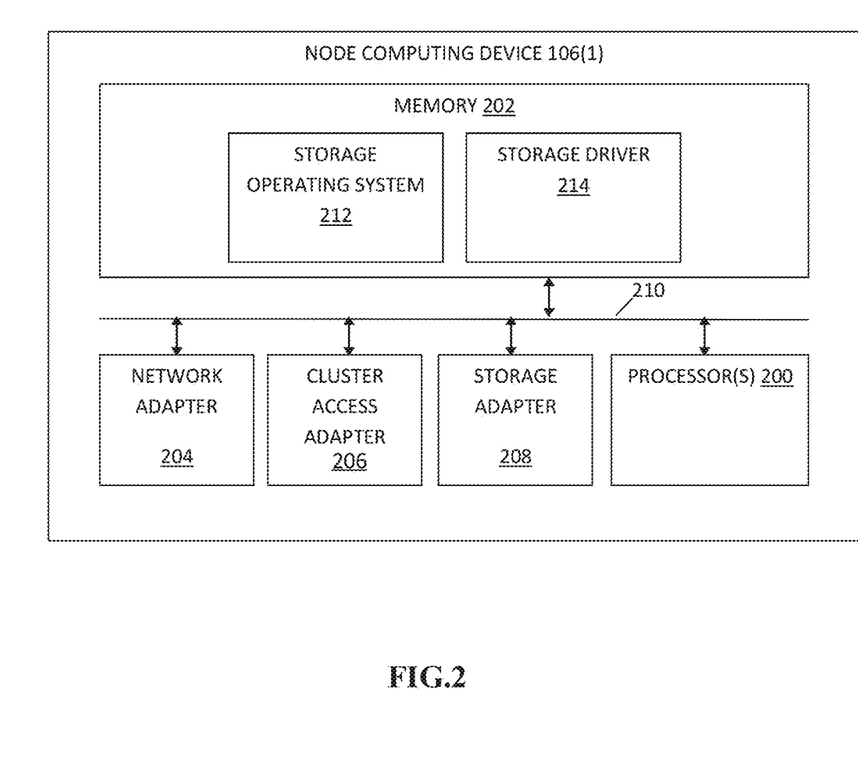
FIG. 2 is a block diagram of an exemplary one of the node computing devices shown in FIG. 1.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106 also includes a storage operating system 212 installed in the memory 206 that can, for example, implement a Redundant Array of Independent (or Inexpensive) Disks (RAID) data loss protection and recovery scheme to optimize a reconstruction process of data of a failed disk or drive in an array. In some examples, the node computing device 106(n) is substantially the same in structure and/or operation as node computing device 106(1), although the node computing device 106(n) can include a different structure and/or operation in one or more aspects than the node computing device 106(1) in other examples.

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(n) (e.g., or additional clustered devices) in accordance with the client device requests.

The storage operating system 212 can also establish one or more file systems including software code and data structures that implement a persistent hierarchical namespace of files and directories, for example. As an example, when a new data storage device (not shown) is added to a clustered network system, the storage operating system 212 is informed where, in an existing directory tree, new files associated with the new data storage device are to be stored. This is often referred to as "mounting" a file system.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

Accordingly, the examples may be embodied as one or more non-transitory computer readable media having machine or processor-executable instructions stored thereon for one or more aspects of the present technology, as described and illustrated by way of the examples herein, which when executed by the processor(s) 200, cause the processor(s) 200 to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 3-11, for example.

The network adapter 204 in this example includes the mechanical, electrical and signaling circuitry needed to connect the node computing device 106(1) to one or more of the client devices 108(1)-108(n) and one or more of the training data servers 130(1)-130(n) over storage network connections 112(1)-112(n), which may comprise, among other things, a point-to-point connection or a shared medium, such as a local area network. In some examples, the network adapter 204 further communicates (e.g., using TCP/IP) via the fabric 104 and/or another network (e.g. a WAN) (not shown) with cloud storage devices to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller) or requests by one of the training data servers 130(1)-130(n). The information may be stored on any type of attached array of writeable media such as magnetic disk drives, SSDs, and/or any other similar media adapted to store information.

In the exemplary data storage devices 110(1)-110(n), information can be stored in data blocks on disks. The storage adapter 208 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(n), one of the requesting training data servers 130(1)-130(n), or alternatively received from one of the training data servers 130(1)-130(n), and/or sent to another node computing device attached via the cluster fabric 104. In some examples, a storage driver 214 in the memory 202 interfaces with the storage adapter to facilitate interactions with the data storage devices 110(1)-110(n), as described and illustrated in more detail later with reference to FIGS. 3-11.

Figure 3:
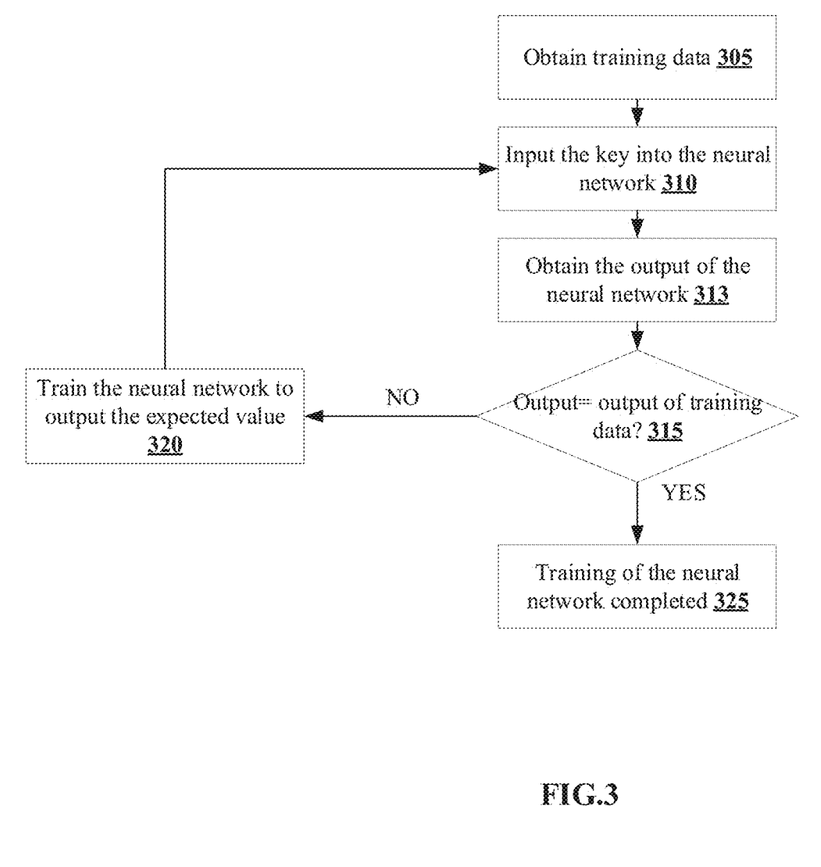
FIG. 3 is a flowchart of an exemplary method for training a neural network.

Referring to FIG. 3, an exemplary method for training neural networks to perform input-output operations will now be described. At step 305, the node computing device 106(1) obtains the training data from one of the plurality of training data servers 130(1)-130(n) to train neural networks residing within the data storage devices 110(1)-110(n), although the neural networks can reside at other memory locations and can obtain the data from other locations. In this example, each of the neural networks is a programmable function, y=f(x; w), that is parameterized by its weights, w, although other types of neural networks may be used. Further, in this example, the training data includes the values of x and y where x is a key (key is a string of bits) value that is received along with a read or write operation and y is the index value indicating the address of either the data required for the read or write operation or the address of another neural network.

Figure 4:
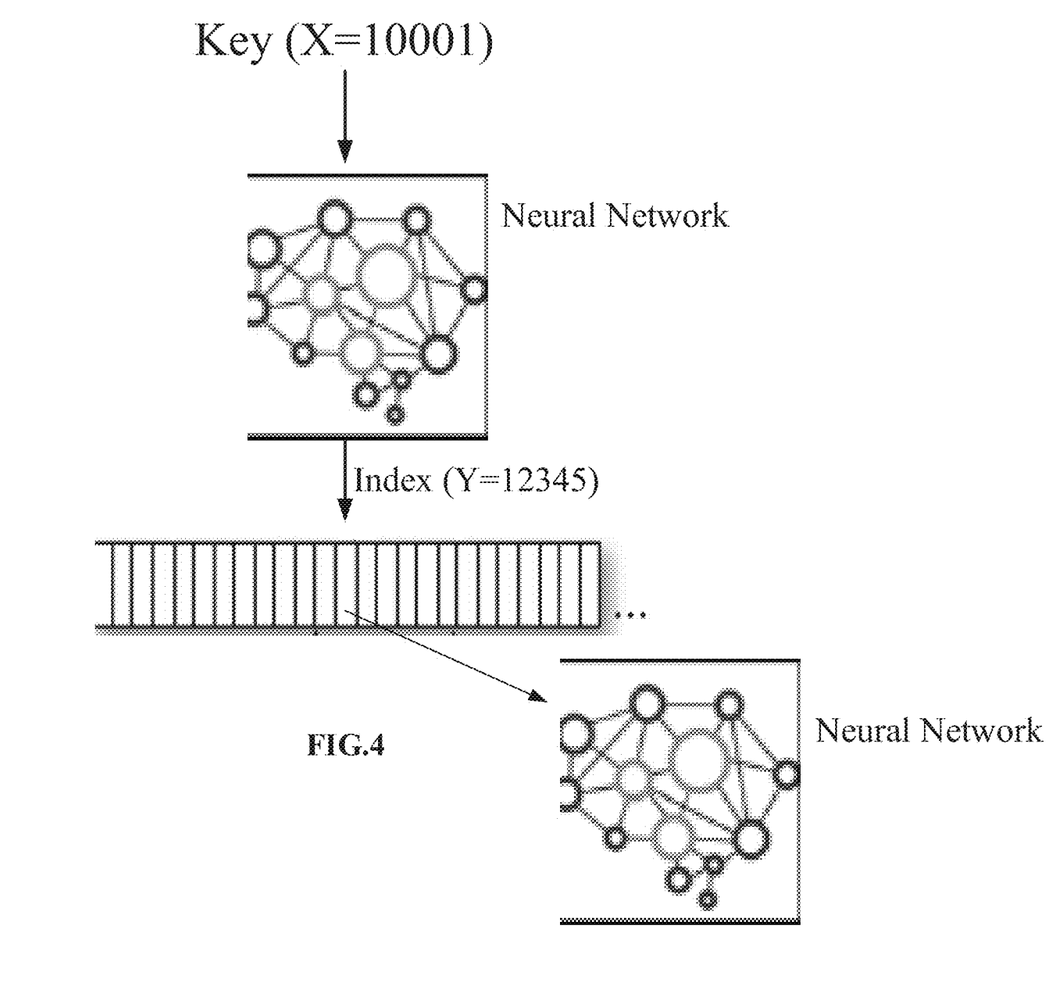
FIG. 4 is an exemplary data flow diagram representing inputting a key value into the neural network and obtaining an output value as an index.

Next in step 310, the node computing device 106(1) inputs one of the received keys in the training data to one of the neural networks present within the data storage devices 110(1)-110(n). By way of example and as illustrated in FIG. 4, the node computing device 106(1) inputs a received key, X=10001, into the neural network, although the node computing device 106(1) can input other types of values into the neural network.

In step 313, the node computing device 106(1) obtains the output of the neural network. In this example, the output of the neural network provides an index value that either points to a data block or another neural network stored within the data storage devices 110(1)-110(n), although other types of outputs may be provided. By way of example and as illustrated in FIG. 4, the output of the neural network is an index (Y=12345) to another neural network, although the output can also index to a data block in other examples.

In step 315, the node computing device 106(1) determines when the output obtained in step 313 from the neural network is equal to the index value that was obtained in the training data corresponding to the value of the key. By way of example, if the index value (y) obtained in the training data is 12345 and the output obtained in the step 313 is 12345, then the node computing device 106(1) would determine that the index value obtained as an output is equal to the index value that was obtained in the training data corresponding to the value of the key. In contrast, if the index value (y) obtained in the training data is 12345 and the output obtained in step 313 is 54321, then the node computing device 106(1) would determine that the index value obtained as an output is not equal to the index value that was obtained in the training data corresponding to the value of the key. Accordingly, when the node computing device 106(1) determines that the output obtained in step 313 from the neural network is not equal to the index value that was obtained in the training data corresponding to the value of the key, then the No branch is taken to step 320.

In step 320, the node computing device 106(1) trains the neural network to output the expected value of the index that is defined by the obtained training data. For example, if the expected value of the index is 12345 for an input key of 10001 and the neural network outputs 54321, then the node computing device 106(1) trains the neural network to output the index as 12345 for an input key value of 10001. Additionally in this example, the neural networks are smaller neural networks with fewer weights (where the maximum number of weights is the number of interior nodes times two for input and bias connections plus the number of interior nodes plus one for the connections to the output) and therefore requires less training data to train the neural network than in current approaches. As a result, training these particular neural networks in this example requires less than a millisecond making this training process very quick and efficient. The result of this training of the neural network is a trained artificial intelligence model for performing input-output operations. Next, in this example the flow may proceed to step 310.

However, if back in step 325 when the node computing device 106(1) determines that the output obtained in step 313 from the neural network is equal to the index value that was obtained in the training data corresponding to the value of the key, then the Yes branch is taken to step 325.

Figure 5:
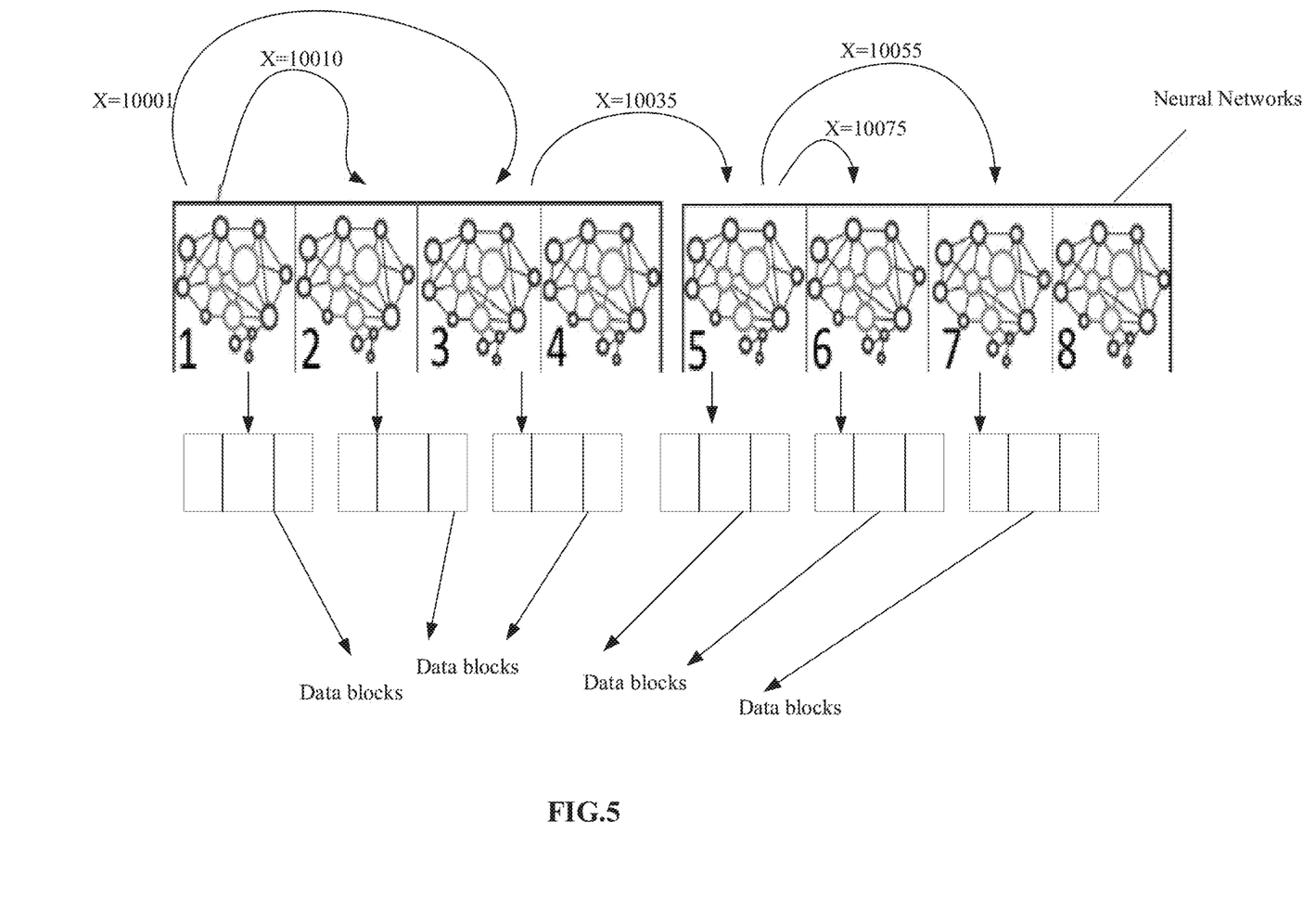
FIG. 5 is an exemplary block diagram illustrating a neural tree.

In step 325, the node computing device 106(1) classifies the neural network to be fully trained and ready to be used as an artificial intelligence model. By way of example, FIG. 5 illustrates a fully trained neural network that is ready to be used as an artificial intelligence model. The fully trained neural network illustrated in FIG. 5 have weights that are either greater than or equal to the expected weights and have been trained to accurately output the index value for each key value. For example, if the key value (X) is equal to 10001, then the neural network outputs an index that points to a second neural network. Subsequently when the key value (X) is used as an input to the second neural network, then output of the neural network indexes to the data blocks on which the read, write, or delete operations can be performed. Additionally in this example, the artificial intelligence model (or fully trained neural network) is physically stored within the disk module 116(n), although the artificial intelligence model can be stored at other memory locations. Further in this example, access to the storage media is only required when an artificial intelligence model is indexed to point to another artificial intelligence model; and by limiting the number of times the storage media is accessed, the disclosed technology is able to effectively utilize the processing cycles required for each media access. In other words, the artificial intelligence models can be arranged in a format that would regulate the media access and can be rearranged based on a storage policy. By way of example, a format that would regulate the media access can include an array, a queue, a linked list, a neural tree, or a binary tree, although other types or combinations of different data structures can be used to store the artificial intelligence models.

Figure 6:
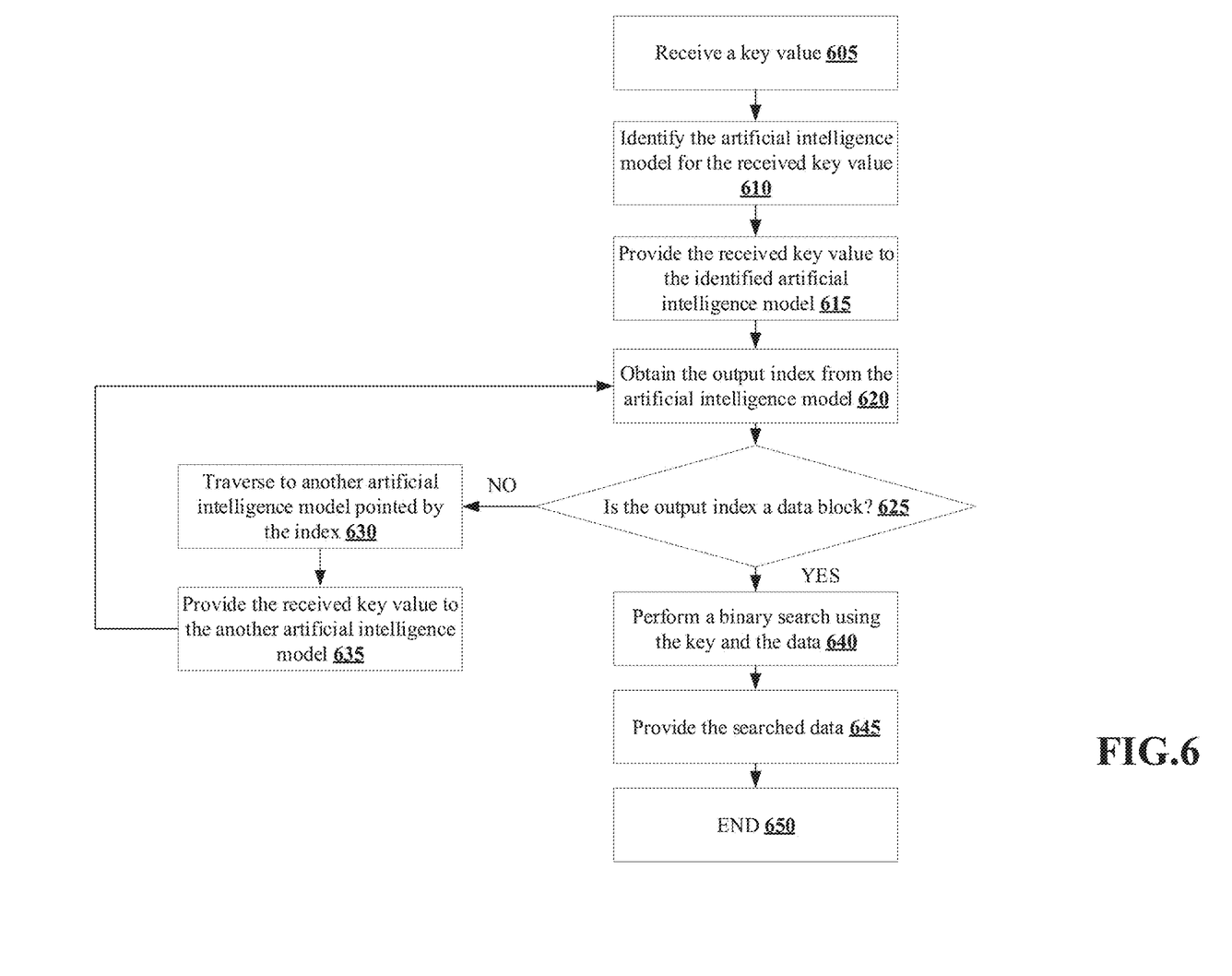
FIG. 6 is an exemplary flowchart illustrating a method of using an artificial intelligence model to search stored data within the data storage apparatuses.
Figure 7:
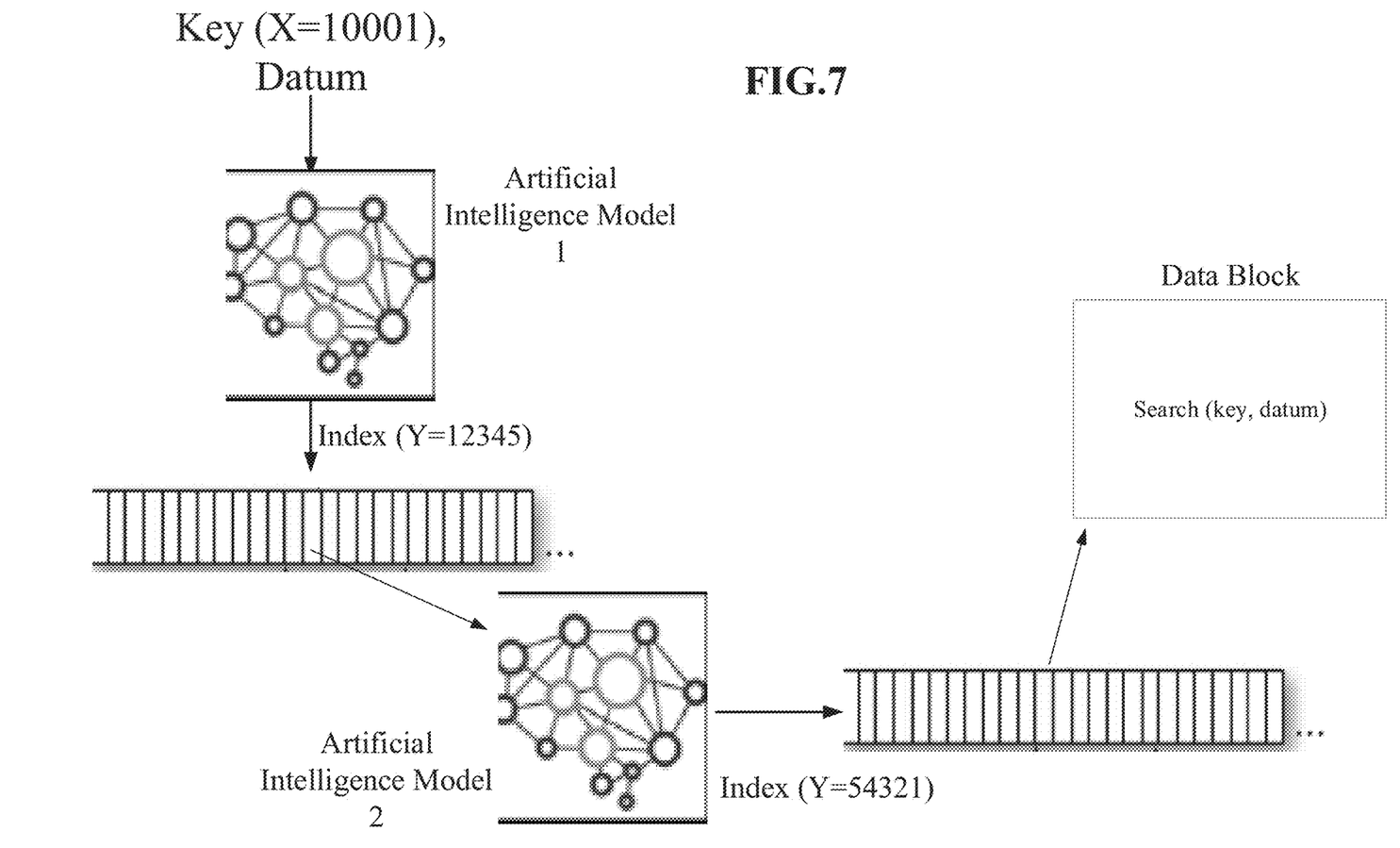
FIG. 7 is an exemplary dataflow diagram illustrating data searching using artificial intelligence models.

Now, an exemplary method to search data stored within the data storage device using a trained artificial intelligence model will now be illustrated using the exemplary flowchart in FIG. 6 and the dataflow diagram in FIG. 7. In step 605, the node computing device 106(1) receives a key value from a client device 108(1), although the node computing device 106(1) can receive other types or amounts of information from other devices.

In step 610, the node computing device 106(1) identifies one of a plurality of artificial intelligence models based on the received key value, although one of the plurality of artificial intelligence models can be selected using other parameters. In this example, each of the artificial intelligence models are associated with a range of key values and the node computing device 106(1) identifies one of the artificial intelligence models that corresponds to the received key value. By way of example, if the key value is between 10001 and 10050, then the node computing device 106(1) can identify artificial intelligence model 1 as the model to be selected for the aforementioned range of key values. Alternatively, the node computing device 106(1) can begin to identify one of the plurality of artificial intelligence models starting with the root model when the artificial intelligence models are arranged as a neural tree.

In step 615, the node computing device 106(1) provides the received key value to the identified one of the plurality of artificial intelligence models.

In step 620, the node computing device 106(1) obtains the output from the identified one of the plurality of artificial intelligence models which is the index that can point to another block including another artificial intelligence model or a data block.

In step 625, the node computing device 106(1) determines when the output index from the identified one of the plurality of artificial intelligence models falls within the range that points to a data block, although the node computing device 106(1) can use other techniques to make the determination. Accordingly, when the output index is within the index range associated with the data block, the node computing device 106(1) determines that the index points to a data block. However, when the output index is within the index range associated with the plurality of artificial intelligence models, then the node computing device 106(1) determines that the output index points to another artificial intelligence model of the plurality of artificial intelligence models. Accordingly, when the node computing device 106(1) determines that the output index is within the plurality of artificial intelligence models, then the No branch is taken to step 630.

In step 630, the node computing device 106(1) traverses to another one of the plurality of artificial intelligence models that is pointed by the output index.

In step 635, the node computing device 106(1) provides another one of the plurality of artificial intelligence models with the received key value and the exemplary flow proceeds to step 620 where the output of the another one of the plurality of artificial intelligence models is obtained. In this example, the steps 620, 625, 630, and 635 repeats until the output index points to a data block.

However, if back in step 625, when the node computing device 106(1) determines that the output index from one of the plurality of artificial intelligence models points to the data block, then the Yes branch is taken to step 640.

In step 640, the node computing device 106(1) performs a binary search within the data block using the received key and the exemplary flow proceeds to step 645. During the binary search, the node computing device 106(1) finds the data that is associated with the provided key by repeatedly dividing in half the portion of the data block that could contain the data until narrowing down the possible locations to just one.

In step 645, the node computing device 106(1) provides the requesting client device 108(1) with the searched data and the exemplary flow ends at step 650.

Figure 8:
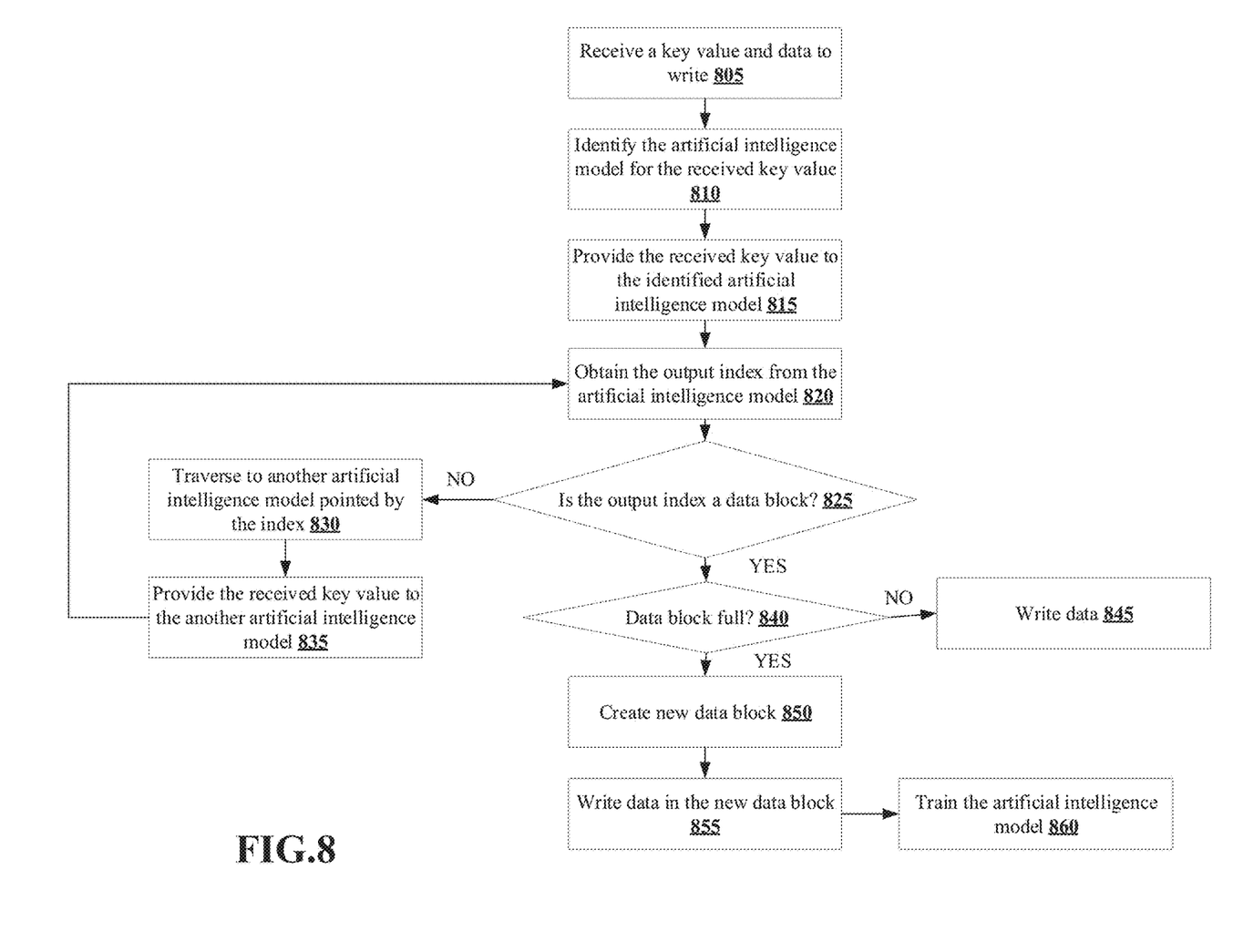
FIG. 8 is an exemplary flowchart illustrating a method of using an artificial intelligence model to write data within the data storage device.
Figure 9:
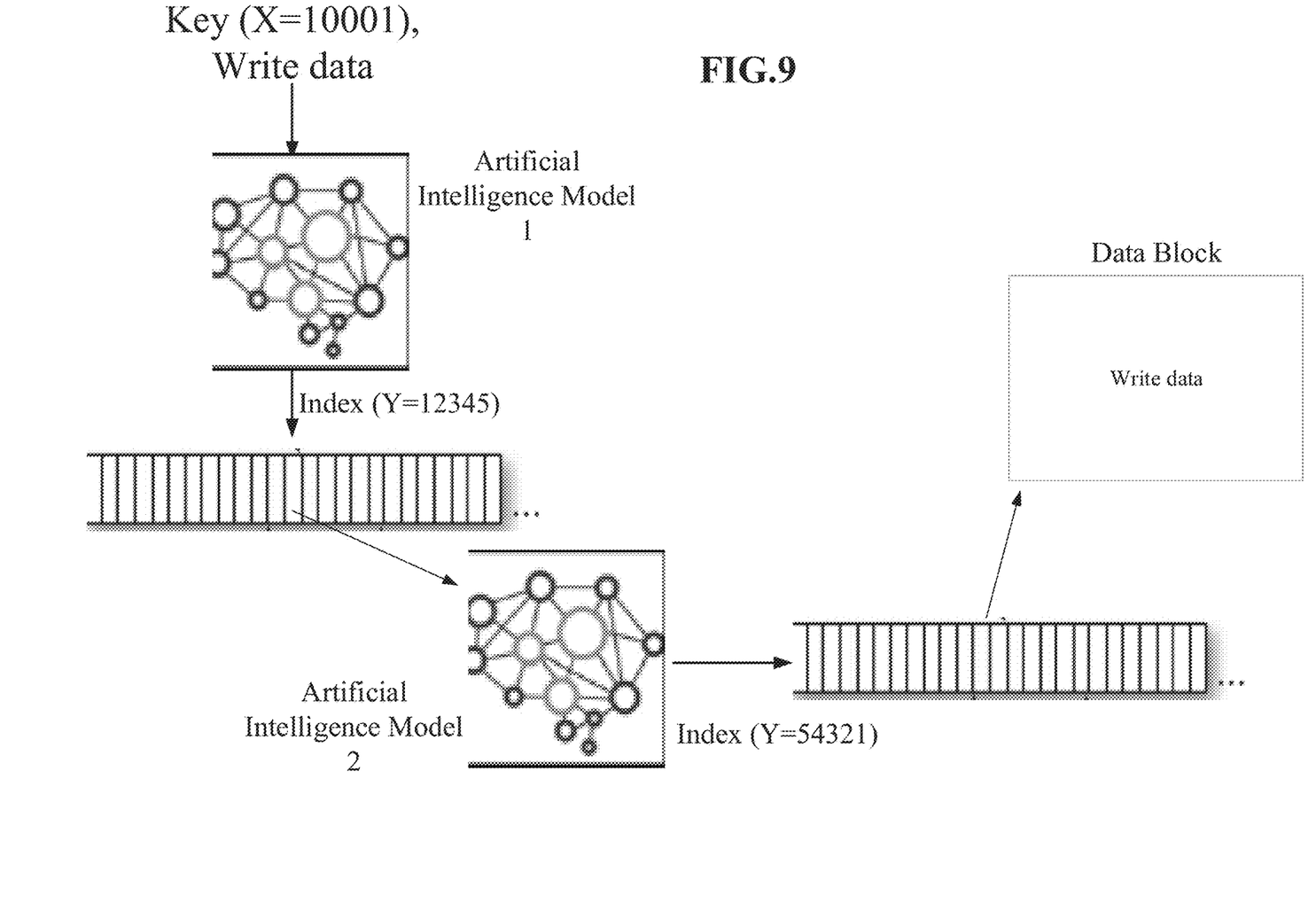
FIG. 9 is an exemplary dataflow diagram illustrating writing data to the data storage device using artificial intelligence models.

Next, an exemplary method to write data to the data storage device using a trained artificial intelligence model will now be illustrated using the exemplary flowchart in FIG. 8 and the dataflow diagram in FIG. 9. In step 805, the node computing device 106(1) receives a key value and the data to be written from a client device 108(1), although the node computing device 106(1) can receive other types or amounts of information from other devices.

In step 810, the node computing device 106(1) identifies one of a plurality of artificial intelligence models based on the received key value, although one of the plurality of artificial intelligence models can be selected using other parameters. In this example, each of the artificial intelligence models are associated with a range of key values and the node computing device 106(1) identifies one of the artificial intelligence models that corresponds to the received key value.

In step 815, the node computing device 106(1) provides the received key value to the identified one of the plurality of artificial intelligence models.

In step 820, the node computing device 106(1) obtains the output from the identified one of the plurality of artificial intelligence models. The output is the index that can point to another block, including another artificial intelligence model or a data block.

In step 825, the node computing device 106(1) determines when the output index from the identified one of the plurality of artificial intelligence models points to a data block based on the range of the output index, although the node computing device 106(1) can use other techniques to make the determination. Accordingly, when the output index is within the index range associated with the data block, the node computing device 106(1) determines that the index points to a data block. However, when the output index is within the index range associated with the plurality of artificial intelligence models, then the node computing device 106(1) determines that output index points to another artificial intelligence model of the plurality of artificial intelligence models. Accordingly, when the node computing device 106(1) determines that output index is within the plurality of artificial intelligence models, then then No branch is taken to step 830.

In step 830, the node computing device 106(1) traverses to another one of the plurality of artificial intelligence models that is pointed by the output index.

In step 835, the node computing device 106(1) provides another one of the plurality of artificial intelligence models with the received key value and the exemplary flow proceeds to step 820 where the output of the another one of the plurality of artificial intelligence models is obtained. In this example, the steps 820, 825, 830, and 835 repeats until the output index points to a data block.

However, back in step 825, when the node computing device 106(1) determines that the output index from one of the plurality of artificial intelligence models points to the data block, then the Yes branch is taken to step 840.

In step 840, the node computing device 106(1) determines when the data block pointed by the output index is above the storage threshold by comparing the current storage of the data block with the storage threshold, although other techniques can be used to make the determination. Accordingly, when the node computing device 106(1) determines that the data block is below the storage threshold, then the Yes branch is taken to step 845.

In step 845, the node computing device 106(1) writes the data to the data block pointed by the output index and the exemplary method ends.

However, back in step 840, when the node computing device 106(1) determines that the data block pointed by the output index is above the storage threshold, then the Yes branch is taken to step 850.

In step 850, the node computing device 106(1) creates a new data block within the data storage device 110(1) and assigns a new index value indicating creation of a new data block.

In step 855, the node computing device 106(1) writes the received data in the newly created data block and the exemplary flow proceeds to step 860.

In step 860, the node computing device 106(1) trains the identified one of the artificial intelligence models with the received key value along with the index of the newly created data block such that the artificial intelligence model would point to the newly created data block for a subsequent input of the key value and the exemplary method ends.

Figure 10:
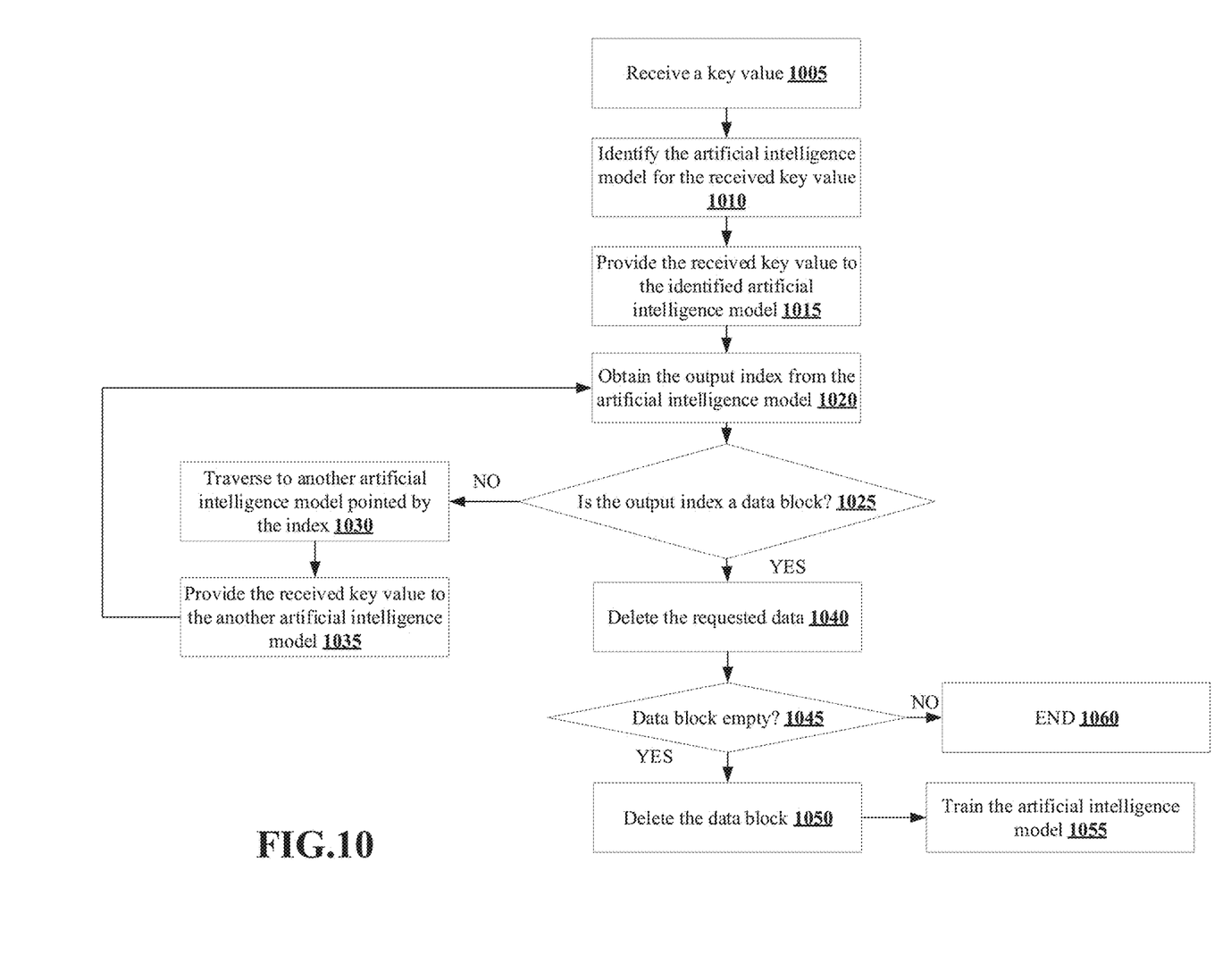
FIG. 10 is an exemplary flowchart illustrating a method of using an artificial intelligence model to delete data within the data storage device.
Figure 11:
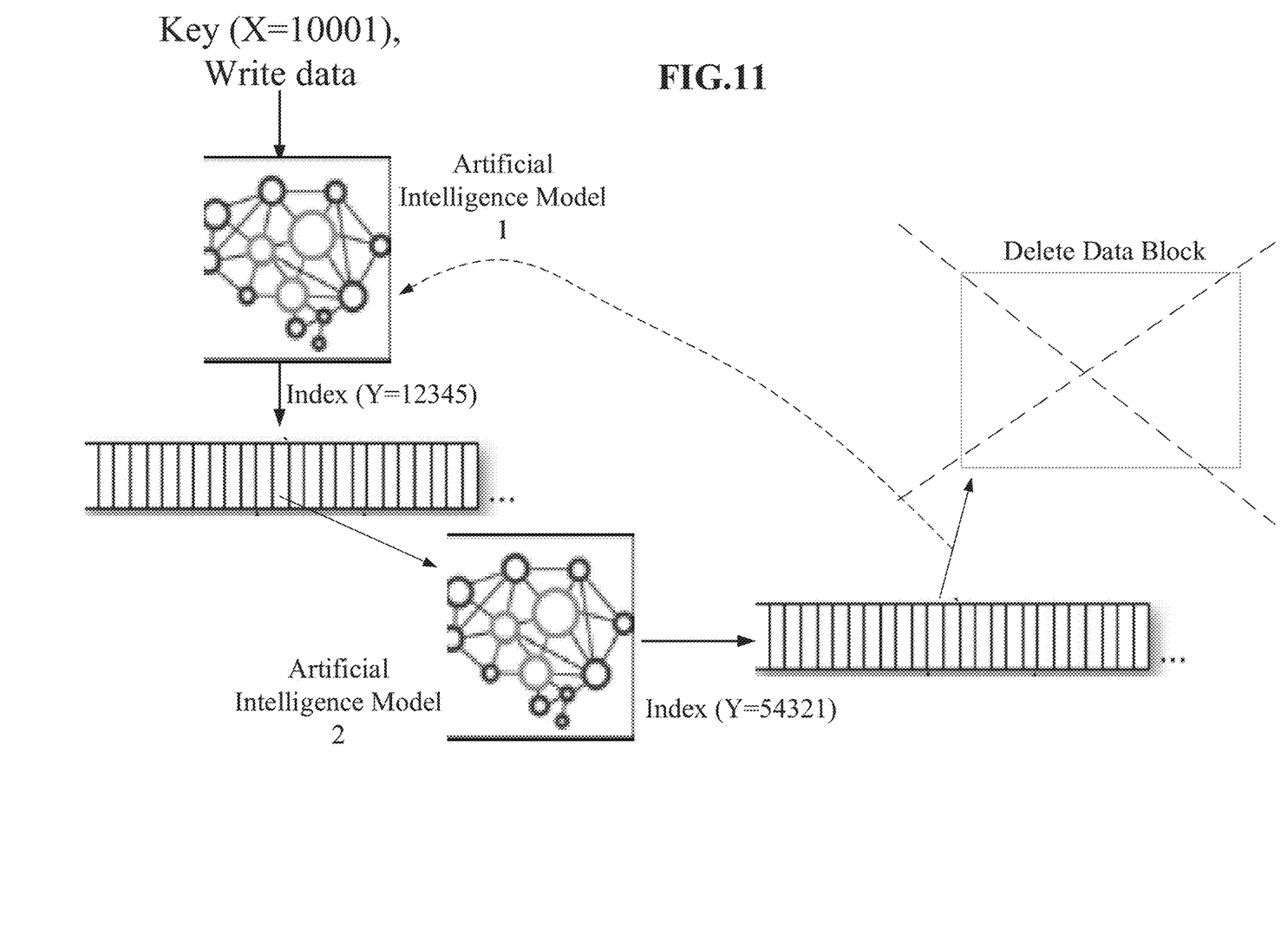
FIG. 11 is an exemplary dataflow diagram illustrating deleting data in the data storage device using artificial intelligence models.

Next, an exemplary method to delete data in the data storage device using a trained artificial intelligence model will now be illustrated using the exemplary flowchart in FIG. 10 and the dataflow diagram in FIG. 11. In step 1005, the node computing device 106(1) receives a key value and the filename including the data to be deleted from a client device 108(1), although the node computing device 106(1) can receive other types or amounts of information from other devices.

In step 1010, the node computing device 106(1) identifies one of a plurality of artificial intelligence models based on the received key value, although one of the plurality of artificial intelligence models can be selected using other parameters. In this example, each of the artificial intelligence models is associated with a range of key values and the node computing device 106(1) identifies one of the artificial intelligence models that corresponds to the received key value.

In step 1015, the node computing device 106(1) provides the received key value to the identified one of the plurality of artificial intelligence models.

In step 1020, the node computing device 106(1) obtains the output from the identified one of the plurality of artificial intelligence models which is the index that can point to another block including another artificial intelligence model or a data block.

In step 1025, the node computing device 106(1) determines when the output index from the identified one of the plurality of artificial intelligence models points to data block based on the range of the output index, although the node computing device 106(1) can use other techniques to make the determination. Accordingly, when the output index is within the index range associated with the data block, the node computing device 106(1) determines that the index points to a data block. However, when the output index is within the index range associated with the plurality of artificial intelligence models, then the node computing device 106(1) determines that output index points to another artificial intelligence model of the plurality of artificial intelligence models. Accordingly, when the node computing device 106(1) determines that output index is within the plurality of artificial intelligence models, then then No branch is taken to step 1030.

In step 1030, the node computing device 106(1) traverses to another one of the plurality of artificial intelligence models that is pointed by the output index.

In step 1035, the node computing device 106(1) provides another one of the plurality of artificial intelligence models with the received key value and the exemplary flow proceeds to step 1020 where the output of the another one of the plurality of artificial intelligence models is obtained. In this example, the steps 1020, 1025, 1030, and 1035 repeats until the output index points to a data block.

However, back in step 1025, when the node computing device 106(1) determines that the output index from one of the plurality of artificial intelligence models points to the data block, then the Yes branch is taken to step 1040.

In step 1040, the node computing device 106(1) deletes the requested data from the data block stored within data storage device 110(1) and the exemplary flow proceeds to step 1045.

In step 1045, the node computing device 106(1) determines when the data block is empty after deleting the data and when the node computing device 106(1) determines that the data block is empty, then the Yes branch is taken to step 1050.

In step 1050, the node computing device 106(1) deletes the entire data block and the index value associated with the deleted data block.

In step 1055, the node computing device 106(1) trains the artificial intelligence model to point to another artificial intelligence model for the received key value indicating that the index value associated with the key value does not exist and the exemplary method ends. However, back in step 1045, when the node computing device 106(1) determines that the data block is not empty, the exemplary flow proceeds to step 1060 where the exemplary method ends.

As illustrated and described by way of the examples here, the above illustrated technology provides a technological solution by avoiding the need to store the physical address of the data present within a volume thereby significantly reducing the number of media access required to perform input-output operations. In other words, the disclosed technology provides artificial intelligence models that can quickly learn the location of the data within the volume and avoids to need to index the block of data using the physical address. Additionally, the disclosed technology uses small neural networks so that the neural networks can be quickly trained for any changes to the data within the file. By using the techniques illustrated above, the disclosed technology is able to improve the performance of the computing device by reducing the media access to perform input-output operations.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method, comprising:
   identifying, by a computing device, one of a plurality of artificial intelligence models based on a key value, wherein each of the artificial intelligence models is associated with a key range and the key value is within the key range associated with the identified one of the artificial intelligence models;
   applying, by the computing device, the key value to the identified one of the artificial intelligence models to generate an output comprising an actual index value, wherein the actual index value points to either a data block or another one of the artificial intelligence models;
   determining, by the computing device, that the actual index value is within an index range associated with another one of the artificial intelligence models;
   applying, by the computing device, the key value to the another one of the artificial intelligence models pointed to by the actual index value to generate another output comprising another actual index value;
   determining, by the computing device, that the another actual index value is within another index range associated with a plurality of data blocks; and
   performing, by the computing device, an input-output operation on one of the data blocks to which the another actual index value points.

2. The method as set forth in claim 1, further comprising training, by the computing device, each of the artificial intelligence models with key values and actual index values, wherein each of the artificial intelligence models comprises a neural network.

3. The method as set forth in claim 1, further comprising training, by the computing device, the identified one of the artificial intelligence models after the input-output operation is performed.

4. The method as set forth in claim 1, wherein the input-output operation comprises a delete operation and the method further comprises deleting, by the computing device, the one of the data blocks to perform the input-output operation.

5. The method as set forth in claim 1, wherein the artificial intelligence models are stored in a format to reduce media access.

6. A non-transitory machine readable medium having stored thereon instructions comprising machine executable code which when executed by at least one machine causes the machine to:
   identify one of a plurality of artificial intelligence models based on a key value, wherein each of the artificial intelligence models is associated with a key range and the key value is within the key range associated with the identified one of the artificial intelligence models;
   apply the key value to the identified one of the artificial intelligence models to generate an output comprising an actual index value, wherein the actual index value points to either a data block or another one of the artificial intelligence models;
   determine that the actual index value is within an index range associated with another one of the artificial intelligence models;
   apply the key value to the another one of the artificial intelligence models pointed to by the actual index value to generate another output comprising another actual index value;
   determine that the another actual index value is within another index range associated with a plurality of data blocks; and
   perform an input-output operation on one of the data blocks to which the another actual index value points.

7. The non-transitory machine readable medium as set forth in claim 6, wherein the machine executable code, when executed by the machine, further causes the machine to train each of the artificial intelligence models with a plurality of values including the key value and the actual index value wherein each of the artificial intelligence models comprises a neural network.

8. The non-transitory machine readable medium as set forth in claim 6, wherein the machine executable code, when executed by the machine, further causes the machine to train the identified one of the artificial intelligence models after the input-output operation is performed.

9. The non-transitory machine readable medium as set forth in claim 6, wherein the input-output operation comprises a write operation and the machine executable code, when executed by the machine, further causes the machine to write data received with the key value from a client device into the one of the data blocks.

10. The non-transitory machine readable medium as set forth in claim 6, wherein the artificial intelligence models are stored in a format to reduce media access.

11. A computing device comprising:
    a memory containing machine readable medium comprising machine executable code having stored thereon instructions for managing workload within a storage system; and a processor coupled to the memory, the processor configured to execute the machine executable code to cause the processor to:
- identify one of a plurality of artificial intelligence models based on a key value received from a client device, wherein each of the artificial intelligence models is associated with a key range and the key value is within the key range associated with the identified one of the artificial intelligence models;
- apply the key value to the identified one of the artificial intelligence models to generate an output comprising an actual index value, wherein the actual index value points to either a data block or another one of the artificial intelligence models;
- determine that the actual index value is within an index range associated with another one of the artificial intelligence models;
- apply the key value to the another one of the artificial intelligence models pointed to by the actual index value to generate another output comprising another actual index value;
- determine that the another actual index value is within another index range associated with a plurality of data blocks; and
- perform an input-output operation on one of the data blocks to which the another actual index value points.

12. The computing device as set forth in claim 11, wherein the processor is further configured to execute the machine executable code to further cause the processor to train each of the artificial intelligence models with a plurality of values including the key value and the actual index value wherein each of the artificial intelligence models comprises a neural network.

13. The computing device as set forth in claim 11, wherein the processor is further configured to execute the machine executable code to further cause the processor to train the identified one of the artificial intelligence models after the input-output operation is performed.

14. The computing device as set forth in claim 11, wherein the input-output operation comprises a read operation and the processor is further configured to execute the machine executable code to further cause the processor to return to the client device data identified based on a binary search performed within the data block using a received key.

15. The computing device as set forth in claim 11, wherein the artificial intelligence models are stored in a format to reduce media access.

16. The computing device as set forth in claim 15, wherein the media access is required when the actual index value is determined to point to another one of the artificial intelligence models.

17. The computing device as set forth in claim 12, wherein each of the artificial intelligence models which each comprise one of a plurality of neural networks is trained in less than a millisecond.

* * * * *